(12) United States Patent
Lavrador et al.

(10) Patent No.: US 8,721,076 B2
(45) Date of Patent: May 13, 2014

(54) PROCESS FOR CONTROLLING A LENS MANUFACTURING PROCESS

(75) Inventors: Isabelle Lavrador, Charenton-le-Pont (FR); Xavier Lippens, Charenton-le-Pont (FR); Alain Chansavoir, Charenton-le-Pont (FR); Philippe Larue, Charenton-le-Pont (FR); Daniel Steigelman, Charenton-le-Pont (FR); Loïc Kabelaan, Charenton-le-Pont (FR); Jean-François Cailloux, Charenton-le-Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 316 days.

(21) Appl. No.: 12/745,368

(22) PCT Filed: Nov. 27, 2008

(86) PCT No.: PCT/EP2008/066344
§ 371 (c)(1),
(2), (4) Date: Jul. 17, 2012

(87) PCT Pub. No.: WO2009/068613
PCT Pub. Date: Jun. 4, 2009

(65) Prior Publication Data
US 2013/0084778 A1    Apr. 4, 2013

(30) Foreign Application Priority Data
Nov. 30, 2007    (EP) .................................. 07301607

(51) Int. Cl.
*G02C 7/02*    (2006.01)
(52) U.S. Cl.
USPC ................. 351/159.76; 351/159.06; 700/109; 700/175; 702/184

(58) Field of Classification Search
USPC ............ 700/90, 95, 108, 109, 110, 117, 118, 700/157, 159, 160, 164, 174, 175, 303, 700/306; 702/1, 81, 82, 84, 127, 155, 156, 702/157, 170, 182–188; 351/159.73–159.77, 159.05–159.21, 351/159.41–159.49; 359/896, 900; 356/124–127; 451/5, 8, 41
See application file for complete search history.

(56) References Cited

U.S. PATENT DOCUMENTS

| 4,229,911 A | 10/1980 | Bicskei |
| 6,522,939 B1 * | 2/2003 | Strauch et al. ................ 700/116 |
| 2003/0017794 A1 | 1/2003 | Kozaki et al. |

(Continued)

FOREIGN PATENT DOCUMENTS

EP    0 849 038 A2    6/1998

(Continued)

*Primary Examiner* — Darryl J Collins
*Assistant Examiner* — Gary O'Neill
(74) *Attorney, Agent, or Firm* — Cozen O'Connor

(57) ABSTRACT

A process for controlling a lens manufacturing process comprising the steps of: a) manufacturing a master lens according to a manufacturing process using a manufacturing device, b) measuring by using at least a measuring device at least one parameter of the master lens of step a), c) recording the value of the parameter, d) repeating regularly step a) to c) and checking the evolution of the parameter over time, wherein the evolution of at least one parameter of the manufacturing device used during the lens manufacturing process is checked over time and the evolution over time of at least one parameter of the master lens is related with the evolution over time of the at least one parameter of the manufacturing device.

18 Claims, 3 Drawing Sheets

(56) References Cited

U.S. PATENT DOCUMENTS

2005/0179154 A1 8/2005 Young et al.
2005/0188516 A1 9/2005 Schneider et al.
2007/0291258 A1* 12/2007 Divo .............................. 356/124

FOREIGN PATENT DOCUMENTS

| EP | 1 248 093 A1 | 10/2002 |
| GB | 1 527 478 | 10/1978 |
| WO | WO 2006/031687 | 3/2006 |

* cited by examiner

100
PROCESS FOR CONTROLLING A LENS MANUFACTURING PROCESS

RELATED APPLICATIONS

This is a U.S. national stage of application No. PCT/EP2008/066344, filed on Nov. 27, 2008.

This application claims the priority of European application no. 07301607.3 filed Nov. 30, 2007, the entire content of which is hereby incorporated by reference.

FIELD OF THE INVENTION

The invention relates to a process for controlling a lens manufacturing process and a lens manufacturing process controlled by such process.

BACKGROUND OF THE INVENTION

Optical lenses, and in particular ophthalmic lenses, require very high quality standard, therefore very high quality manufacturing process is to be used in order to obtain high quality optical lenses.

Historically, optical lenses have been manufactured by different processes such as cast molding.

Cast molding requires the use of two complementary molds in which the lens material is added by gravity casting. These molds present a specific design corresponding to the desired lens design.

Lenses made by cast molding suffer a large number of quality defects during solidification due for example to shrinkage. Shrinkage may cause surface voids and the non-adherence of the final product to the lens design.

In order to assure the quality of the lenses, it is required to have a method for checking the quality of the product lenses.

Different methods for checking the quality of the product lenses by cast molding can be used.

The one by one method consists in checking the product lenses one by one. Such a method does not meet demands of low-cost, high-volume, high-yield rapid production.

A more effective method consists in checking the quality of the molds to be used. An attempt consists in correlating the quality of the manufactured lenses to the quality of the mold. Advantageously, such a method is more compatible with the requirements of low-cost, high-volume, high-yield rapid production. But such a method can give information corresponding to only one manufacturing step.

Furthermore, the molding method presents limitation in terms of quality, cost and is limited in the number of different designs it offers.

Therefore, new manufacturing techniques such as digital surfacing are used.

In the art of lens manufacture, a finished lens is usually made from a semi-finished lens blank or from a finished uncut lens.

Semi-finished lens blanks have usually optically finished front surfaces; however, the back surfaces of these blanks need to be generated and fined. Then, they are either polished and/or coated to produce finished uncut lenses. Finished uncut lenses are then edged to the proper frontal shape and edge contour to fit into spectacle/glasses frames or other mounting structures.

Single vision lenses that are outside the normal range of inventoried finished uncut lenses and most multifocals, namely progressive addition lenses, are made from semi-finished lens blanks. Semi-finished lens blanks are made with various front surface curve radii, and have various topographies including spherical, aspheric, hyperbolic, irregular aspheric such as progressive addition lenses, and polyspheric such as executive type segmented bifocals and trifocals.

Finished uncut lenses are lenses that are optically finished on both front and back surfaces and only need to be edged to the proper shape and edge contour to become finished lenses. Most optical laboratories keep an inventory of single vision finished uncut lenses in various powers, sizes and materials to take care of most of the more common single vision ophthalmic prescriptions. Progressive addition lenses are nowadays possibly manufactured as finished uncut lenses by using a 3D machining usually called "digital surfacing".

To generate a desired prescription for a lens, calculations are required to determine the topography of the surfaces of the lens, namely its back surface if semi-finished lens blank is used. Such calculations typically involve variables that include the front surface radii of the semi-finished blank, the index of refraction of the lens blank material, prescription values of the desired lens, statutory values regarding minimum lens thickness, and the physical dimensions of the frame or mounting structure.

In the art, various means can be used to accomplish the physical process of producing a back surface of optical quality. Most of these methods begin by generating a back surface that approximates the desired back surface topography and surface smoothness using digital surfacing. This approximate surface is then fined to a more perfect approximation in both curvature and surface smoothness.

After the appropriate accuracy and smoothness is achieved in the fining process, the surface is then polished and/or coated to produce a surface of optical quality. The optically finished lens blank is then edged to the proper shape and edge profile to fit into or with the frame for which the lens was made.

The quality of the lens produced using a digital surfacing process requires to be checked. The lens that is produced using the digital surfacing process corresponds to a given prescription. Therefore a quality checking method that would check the quality of a small fraction of the produced lens would not be reliable.

The solution commonly used is to check the quality of each individual lens as they are produced. However as for the molding manufacturing process such method does not meet demands of low-cost, high-volume, high-yield rapid production.

Therefore, there is a need for an efficient method to assure the quality of the lenses products, in particular for lens produced using manufacturing process that does not involve molds. Thus, the goal of the present invention is to provide a process for controlling the quality of the manufactured lenses.

SUMMARY OF THE INVENTION

One aspect of the invention relates to a controlling process for controlling a lens manufacturing process comprising the steps of:
 a) manufacturing a master lens according to a manufacturing process using a manufacturing device,
 b) measuring by using at least a measuring device at least one parameter of the master lens of step a),
 c) recording the value of the parameter,
 d) repeating regularly step a) to c) and checking the evolution of the parameter over time,
wherein the evolution of at least one parameter of the manufacturing device used during the lens manufacturing process is checked over time and the evolution over time of at least one parameter of the master lens is related with the evolution over time of the at least one parameter of the manufacturing device.

Advantageously, such process allows to reliably checking the quality of the lenses that are produced without having to check each lens individually. Indeed, the evolution of the measured parameter over time will give an indication of the reliability of the manufacturing process, in particular of the manufacturing devices, and therefore the quality of the manufactured lenses.

According to further embodiments which can be considered alone or in combination:
- the master lens has a different geometrical and/or optical parameter and/or made of a different material than the lenses to be manufactured during the manufacturing process;
- at least one of the measured parameters of the master lens is an optical parameter;
- the master lens is a progressive additional lens and wherein at least one of the measured parameters of the master lens is an optical and/or a geometrical parameter, for example parameters in the far and/or the near vision zone;
- the optical parameter is measured using frontofocometer and/or an optical mapping device;
- the process comprises the step of providing to the manufacturing device a digital file including the master lens design;
- the process includes a progressive lens surfacing process, for example a digital surfacing process;
- the process comprises a feedback loop between the process for controlling a lens and the manufacturing device using the evolution of the at least one measured parameter of the master lens,
- a reference master lens is provided or manufactured and at least one measuring device is checked over time by measuring at least one parameter of the reference master lens,
- the master lenses have the same design as the reference master lens,
- the at least one parameter measured on the master lens is the same as the at least one parameter measured on the reference master lens,
- the process further comprises checking the evolution over time of at least one measured parameter of the reference master lens,
- the process comprises a feedback loop between the process for controlling a lens and the measuring device using the evolution of the at least one measured parameter of the reference master lens.

According to another aspect, the invention relates to a manufacturing process for manufacturing a lens using a manufacturing device comprising the steps of:
- providing a lens blank (10),
- blocking the lens blank (12),
- surfacing at least one surface of the lens blank (14, 16), and where the manufacturing process is checked by previous controlling process for controlling a lens manufacturing process.

According to an embodiment, the process includes a progressive lens surfacing process, for example a digital surfacing process.

According to an embodiment, the process comprises a feedback loop between the process for controlling a lens and the manufacturing device using the evolution of the at least one physical parameter of the regularly manufactured master lenses.

Another aspect of the invention relates to a computer program product for a data processing device, the computer program product comprising a set of instructions which, when loaded into the data processing device, causes the data processing device to perform at least one of the steps, for example all of the steps, of the method according to the invention.

In addition, another aspect of the present invention provides a computer-readable medium carrying one or more set of instructions of a computer program product of the invention.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus. The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

In the sense of the invention "the manufacturing parameters" are the setting parameter of the different manufacturing devices involved in the manufacturing process. In the sense of the invention "the process parameter" includes any measurable parameters on the manufacturing devices used for the manufacturing of the lens.

BRIEF DESCRIPTION OF THE DRAWINGS

Non limiting embodiments of the invention will now be described with reference to the accompanying drawing wherein.

DETAILED DESCRIPTION OF THE DRAWINGS

Figure 1:
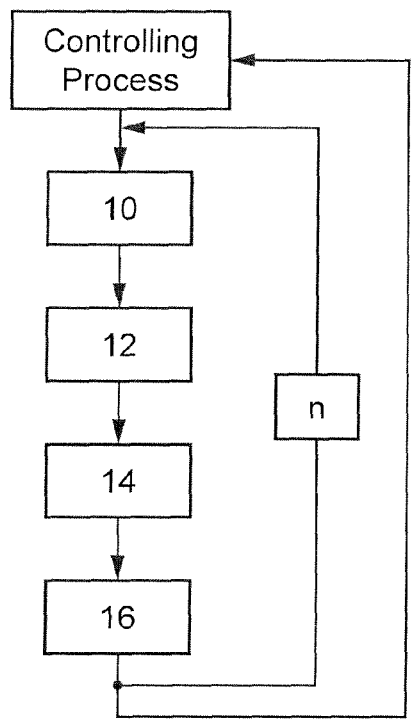
FIG. 1 is a flowchart of the steps comprised in a manufacturing process according to an embodiment of the invention.

FIG. 1 illustrated the steps of a manufacturing process according to the invention, i.e. susceptible of being controlled by a controlling process according to the invention.

In an embodiment of the invention, the manufacturing process for manufacturing a lens using a manufacturing device comprises the steps of providing 10 a lens blank, blocking 12 the lens blank using a blocking device, machining 14 one surface of the lens blank using a machining device, for example a generator or 3D coarse grinding machining device and polishing 16 the machined surface of the lens using a polisher. The manufacturing steps 10 to 16 are repeated n times. After n repetitions of the manufacturing steps a controlling process according to the invention is processed.

The manufacturing process according the invention can be used to manufacture any type of lens, for example ophthalmic lens such as for example progressive additional lens.

The lens blank provided during the providing step 10 can be a semi-finished lens blank.

The blocking step can be processed using any blocking devices known from the man skilled in the art; such a device is disclosed for example in patent documents U.S. Pat. No. 4,229,911 or WO 2006/031687.

The manufacturing step 14 consists in generating a desired design on the unfinished surface of the lens. Generators are common devices known from the man skilled in the art; such a device is disclosed for example in patent documents EP 0 849 038 or US 2005/0188516.

The polishing step 16 consists in smoothing the manufactured surface. Polishing devices are well known in the art.

Optionally, prior to the initial start of the manufacturing process, the manufacturing devices undergo a qualification process.

The qualification process consists in producing a large number, for example more than 10, for example 30, of optical lenses with a given design and checking that the distribution of a given parameter, measured on the produced lenses, has a distribution, for example a normal distribution, with a mean equal to the mean of the maximum tolerance and the minimum tolerance for the measured parameter.

The qualification process comprises the step of:
 a) manufacturing a qualification lens according to a manufacturing process using a manufacturing device,
 b) measuring at least one parameter of the qualification lens of step a),
 c) recording the value of the parameter,
 d) repeating successively step a) to c) and recording the value of the parameter for each successive master lens produced.

The tolerances for the measured parameter can be defined according to an ISO standard, if so they can be referred to as Upper Specification Limit (USL) and Lower Specification Limit (LSL). The ISO 8980-2 stipulates specification for progressive power lens.

During the qualification process of a manufacturing device, if for example the measured parameter does not present a normal distribution or if the mean of the measured values is not equal to the mean of the maximum tolerance and the minimum tolerance, the manufacturing parameters of the manufacturing device may be adjusted.

The qualification process can be applied to check any of the manufacturing devices, such as for example the blocking device, the machining device or the polishing device. For a given manufacturing device the qualification process can be applied to any of the manufacturing parameter, such as for example the speed of rotation of a grinding tool or the temperature of the device or the speed or translation of the 3 axes of the manufacturing devices.

Preferably, the measured parameter is chosen so as to be correlated to a given manufacturing parameter.

The qualification lens manufactured during the qualification process can have any type of design allowing measuring the pertinent parameters.

Once the manufacturing parameters have been properly calibrated using the qualification process, lenses can be manufactured using the manufacturing process according to the invention.

Figure 2:
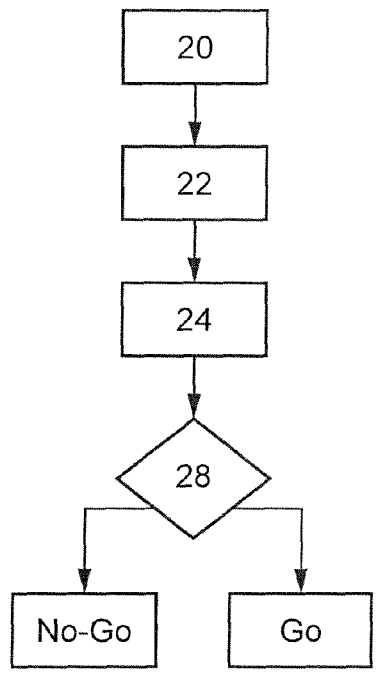
FIG. 2 is a flowchart of the steps comprised in a controlling process according to an embodiment of the invention.

Such a manufacturing process can be controlled by a controlling process according to the invention as illustrated on FIG. 2, and comprising the steps of:
 a) manufacturing a master lens 20 according to a manufacturing process using a manufacturing device,
 b) measuring at least one parameter of the master lens 22 of step a),
 c) recording the value of the parameter 24,
 d) repeating regularly step a) to c) and checking 28 the evolution of the at least one parameter over time.

Prior to the controlling process one can define a No-Go upper value and a No-Go lower value for each measured parameters. The No-Go upper and lower values can be defined according to an ISO standard. The ISO 8980-2 stipulates specification for progressive power lens.

If the measured value of the parameter is not between the No-Go lower and upper values, the manufacturing process can be stopped.

Prior to the controlling process, one can also define a process tolerance upper value, also called Upper Control Limit and a process tolerance lower value, also called Lower Control Limit, for each of the measured parameter. For example, the process tolerance upper value is smaller that the No-GO upper value and the process tolerance lower value is greater than the No-Go lower value.

If the measured value of the parameter is between the process tolerance upper value and the No-Go upper value or between the process tolerance lower value and the No-GO lower value, the manufacturing process parameter can be checked.

According to an embodiment of the invention the upper and lower control limits for a given parameter can be determined during the qualification process. The control limits are determined by calculating the mean of the measured values of the given parameter on the optical lenses manufactured during the qualification process. The standard deviation of the measured values of the given parameter is calculated.

The upper control limit for a given parameter can be defined as three times the standard deviation added to the mean of the measured values of the given parameter.

The lower control limit for a given parameter can be defined as three times the standard deviation subtracted to the mean of the measured values of the given parameter.

According to an embodiment of the invention, a reference master lens is provided or manufactured and at least one measuring device is checked over time by measuring at least one parameter of the reference master lens.

Advantageously, these additional steps allow checking that the measuring device has no defects.

According to an embodiment, the master lenses can be manufactured daily and can have the same design as the reference master lens and the measured parameters of the master lenses can be the same as the ones of the reference master lens.

According to other embodiments, the master lenses can be manufactured several times per day or be manufactured on a regular basis not every day.

According to an embodiment of the invention the master lens has a different geometrical and/or optical parameter and/ or is made of a different material than the lenses to be manufactured during the manufacturing process.

The choice of the master lens can be done so as to amplify the sensibility of certain parameter to the process parameters. For example, the master lens is made of a material and has a design such as its optical parameters are more sensible to a modification of the process parameter that the usual manufactured lenses.

The master lens can have the same design as the qualification lens used for the qualification process of the manufacturing devices of the manufacturing process.

An example of a master lens design is illustrated in FIG. 3. The master lens illustrated in FIG. 3, is a circular progressive lens of 60 mm of diameter. The master lens is made of a material having a refractive index of 1.665.

Figure 3C:
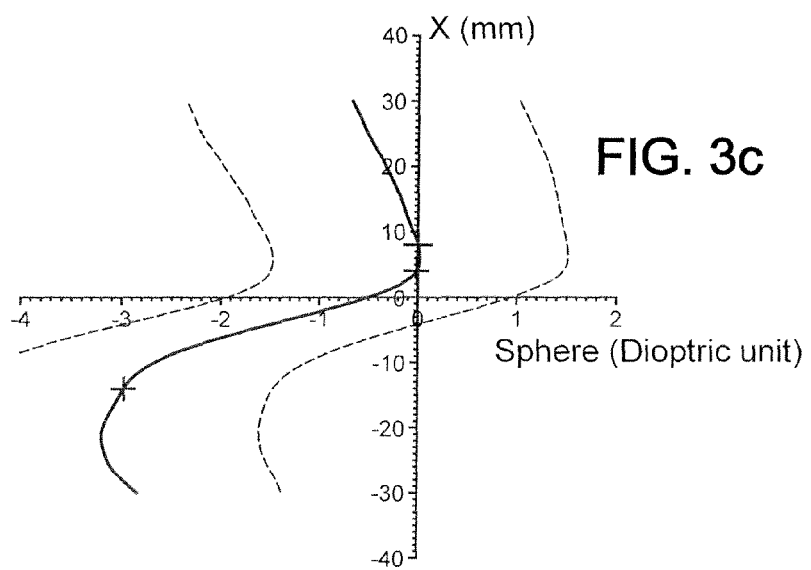
FIGS. 3A-3C show an example of a design of a master lens according to an embodiment of the invention.
Figure 3A:
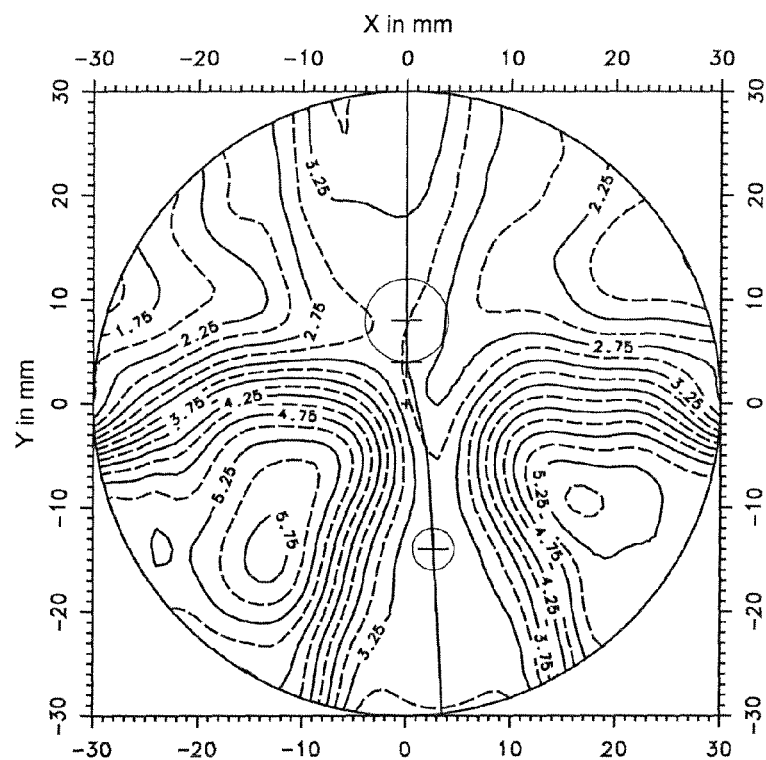
Figure 3B:
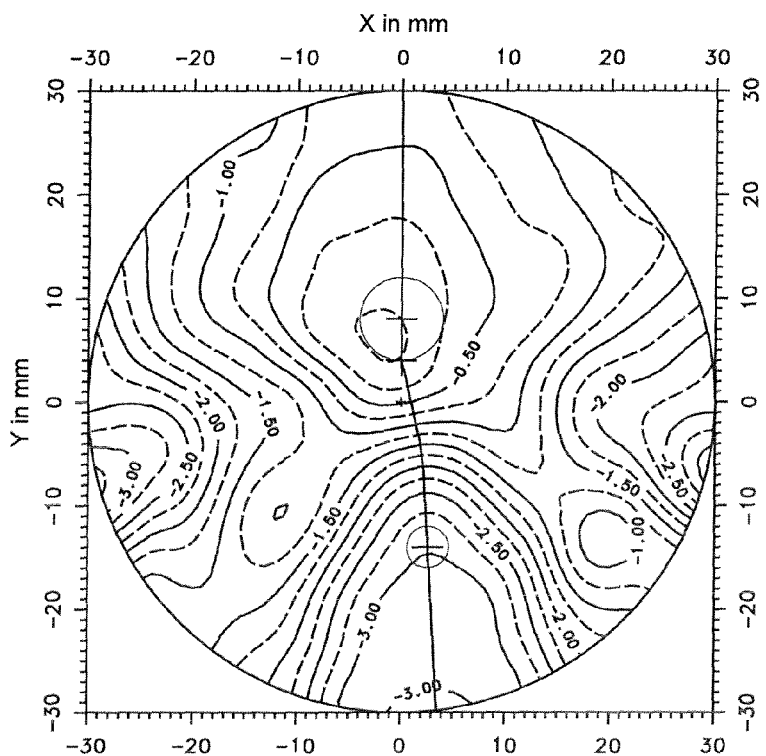

FIGS. 3a and 3b are charts showing the distribution of the cylindrical and spherical power of a master lens suitable for the controlling process.

FIG. 3c illustrates the power progression along the meridian line of the master lens represented on FIGS. 3a and 3b.

As illustrated, the master lens can present a non conventional design, for example in the far and near vision zone, for example the power can decrease in the far vision zone and/or in the near vision zone.

The controlling process according to the invention may comprise the measurements and recording of certain manufacturing device parameters.

The evolution of such manufacturing device parameters can be checked over time.

Checking the evolution over time of manufacturing device parameters and measured parameters on the master lens can highlight a correlation between those parameters.

Advantageously, when a correlation can be found between the evolution of a measured parameter of a given master lens design and the evolution of a parameter of the manufacturing device, the controlling process can help identifying the cause of a drift or shift of a measured parameter.

The measured parameter can be an optical parameter, such as the dioptric power at a given point of the surface of the master lens, or cosmetic parameter, such as cosmetic defect on the surface of the master lens.

The measured parameter can be measured by any means known of the person skilled in the art. For example, the optical parameters can be measured using a frontofocometer, an optical mapper, and the cosmetic parameters can be measured using an Arc Lamp.

An example of frontofocometer is disclosed in patent document GB 1 527 478 and an example of optical mapper is disclosed in patent document EP 1 248 093.

The following examples of optical parameters are included to illustrate embodiment of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

According to an embodiment of the invention the optical power in the near vision zone is controlled.

The controlling process according to the invention can be used to check the evolution over time of the dioptric power (in diopter unit) at a given point in the near vision zone of a master lens.

Figure 4:
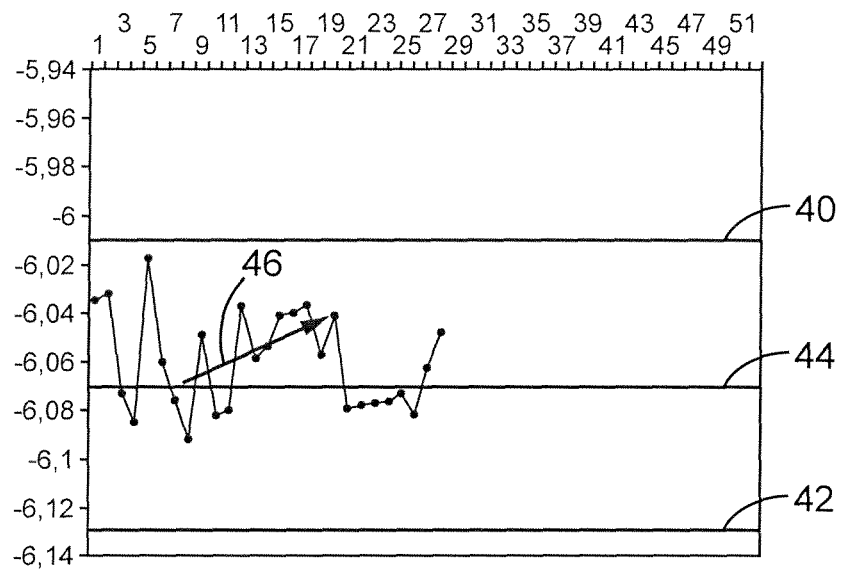
FIGS. 4 and 5 are examples of plots of measured parameters over time.

On the graph represented on FIG. 4 the dioptric power measured at a given point in the near vision zone of a master lens, for example having the design illustrated on FIGS. 3, and being manufactured and measured every day is reported as a function of time, for about 30 consecutive days.

Examples of tolerances upper 40 and lower 42 limits for the dioptric power at the measured point in the near vision zone are reported on FIG. 4. The mean value 44 of the tolerances upper 40 and lower 42 limits is also reported on FIG. 4.

As illustrated by the drifting arrow 46, the measured dioptric power daily measured can drift away from its mean value.

During the manufacturing process the manufactured lens is blocked in a blocking plan, commonly a horizontal plan. The grinding tools can move in the blocking plan along two axes X and Y and can also move along an axis Z perpendicular to the blocking plan.

Without being bond by such observation, the inventors have observed that such drift of the dioptric power in the near vision zone can be linked to a dirty rail in one of the manufacturing devices, for example a dirty rail allowing the movement of the grinding tool along one of the blocking plan axis of the generator.

Advantageously, checking over time the dioptric power of a point in the far vision zone of a daily manufactured master lens, for example having the design illustrated on FIGS. 3, is a way of checking the manufacturing process, in particular one can check the evolution over time of the rails of the manufacturing devices, such as the generator or the polishing device.

According to an embodiment of the invention the optical power in the near vision zone is controlled.

The controlling process according to the invention can be used to check the evolution over time of the dioptric power (in diopter unit) at a given point in the near vision zone of a master lens.

Figure 5:
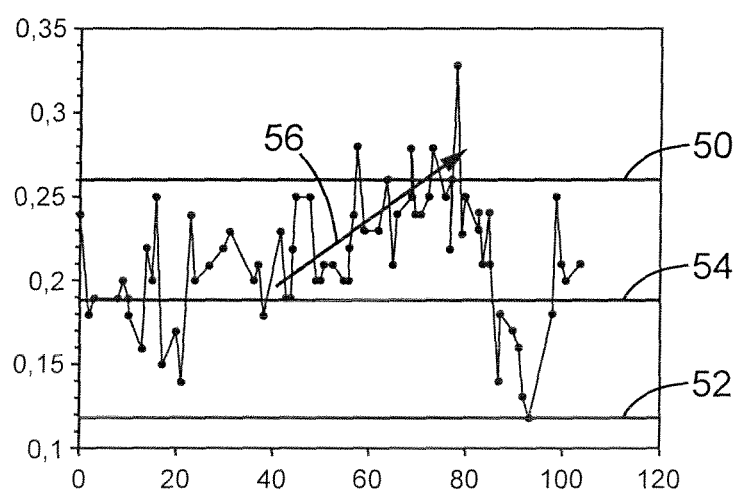

On the graph represented on FIG. 5, the measured dioptric power at a given point in the far vision zone of a master lens, for example having the design illustrated on FIGS. 3, is reported as a function of time (in days), after having been manufactured and measured regularly over the time, during 100 day.

Examples of tolerances upper 50 and lower 52 limits for the dioptric power at the measured point in the far vision zone are reported on FIG. 5. The mean value 54 of the tolerances upper 50 and lower 52 limits is also reported on FIG. 5.

As illustrated by the drifting arrow 56, the measured dioptric power measured regularly over the time can drift away from its mean value.

Without being bond by such observation, the inventors have observed that such drift of the dioptric power in the far vision zone can be linked to the wearing of the grinding tool of one of the manufacturing devices, for example the grinding tool of the generator.

Advantageously, checking over time the dioptric power of a point in the far vision zone of a manufactured master lens, for example having the design illustrated on FIGS. 3, is a way of check the manufacturing process, in particular one can check the evolution over time of the rails of the manufacturing devices, such as the generator or the polishing device.

According to an embodiment of the invention the ECTC or ECTS (Standard deviation of the deviations of the cylinder or sphere) is controlled.

The ECTC corresponds to the standard deviation of the difference between the theoretical and the measured values of the cylinder at a particular point of the manufactured master lens.

The ECTS corresponds to the standard deviation of the difference between the theoretical and the measured values of the sphere at a particular point of the manufactured master lens.

The inventors have observed that the evolution of the ECTC and the ECTS is very sensible to the quality of the positioning of the manufactured unfinished lens.

Advantageously, a drift of the ECTC or ECTS value over time can indicate a positioning error of the unfinished lens during the manufacturing process.

The invention has been described above with the aid of an embodiment without limitation of the general inventive concept; in particular the measured parameters are not limited to the examples discussed.

The invention claimed is:

1. A process for controlling a spectacle lens manufacturing process comprising the steps of:
   a) manufacturing a master lens according to a manufacturing process using a manufacturing device,
   b) measuring by using at least a measuring device at least one parameter of the master lens of step a),
   c) recording the value of the parameter,
   d) repeating regularly step a) to c) and checking the evolution of the parameter over time,
   wherein the evolution of at least one parameter of the manufacturing device used during the lens manufacturing process is checked over time and the evolution over time of at least one parameter of the master lens is related with the evolution over time of the at least one parameter of the manufacturing device.

2. The process according to claim 1, wherein the master lens has a different geometrical and/or optical parameter and/or made of a different material than the lenses to be manufactured during the manufacturing process.

3. The process according to claim 1 or 2, wherein at least one of the measured parameters of the master lens is an optical parameter.

4. The process according to claim 1 or 2, wherein the master lens is a progressive addition lens and wherein at least one of the measured parameters of the master lens is an optical and/or a geometrical parameter.

5. The process according to claim 4, wherein said at least one of the measured parameters of the master lens is a parameter in the far and/or the near vision zone.

6. The process according to claim 1, wherein the optical parameter is measured using a frontofocometer.

7. The process according to claim 1, wherein the optical parameter is measured using an optical mapping device.

8. The process according to claim 1, comprising the step of providing to the manufacturing device a digital file including the master lens design.

9. The process according to claim 1, comprising a feedback loop between the process for controlling a lens and the manufacturing device using the evolution of the at least one measured parameter of the master lens.

10. The process according to claim 1, wherein a reference master lens is provided or manufactured and at least one measuring device is checked over time by measuring at least one parameter of the reference master lens.

11. The process according to claim 10, wherein the master lenses manufactured when repeating regularly step a) to c) have the same design as the reference master lens.

12. The process according to claim 10 or 11, wherein the at least one parameter measured on the master lens is the same as the at least one parameter measured on the reference master lens.

13. The process according to claim 10, wherein step d) further comprises checking the evolution of the measured at least one parameter of the reference master lens.

14. Manufacturing process for manufacturing a spectacle lens using a manufacturing device comprising the steps of:
   providing a lens blank,
   blocking the lens blank,
   surfacing at least one surface of the lens blank,
   wherein the manufacturing process is checked by a process according to claim 1.

15. The process according to claim 1 or 14, wherein the process includes a progressive lens surfacing process.

16. The process according to claim 15, wherein the lens surfacing process is a digital surfacing process.

17. The process according to claim 1 or 14, wherein the process comprises a feedback loop between the process for controlling a lens and the manufacturing device using the evolution of the at least one physical parameter of the regularly manufactured master lenses.

18. A computer program product for a data-processing device, the computer program product comprising a set of instructions which, when loaded into the data-processing device, causes the device to perform all of the steps of the processes as claimed in claim 1 or 14.

* * * * *